United States Patent
Kariyazono et al.

(10) Patent No.: US 11,186,673 B2
(45) Date of Patent: Nov. 30, 2021

(54) COMPOSITION FOR USE AS OPTICAL MATERIAL

(71) Applicant: MITSUBISHI GAS CHEMICAL COMPANY, INC., Tokyo (JP)

(72) Inventors: Kazuki Kariyazono, Osaka (JP); Takashi Aoki, Mie (JP); Kouhei Takemura, Tokyo (JP); Kikuo Furukawa, Osaka (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 139 days.

(21) Appl. No.: 16/492,868

(22) PCT Filed: Feb. 26, 2018

(86) PCT No.: PCT/JP2018/007006
§ 371 (c)(1),
(2) Date: Sep. 10, 2019

(87) PCT Pub. No.: WO2018/168419
PCT Pub. Date: Sep. 20, 2018

(65) Prior Publication Data
US 2020/0223975 A1 Jul. 16, 2020

(30) Foreign Application Priority Data
Mar. 17, 2017 (JP) .............................. JP2017-052122

(51) Int. Cl.
| C08G 18/16 | (2006.01) |
| G02B 1/04 | (2006.01) |
| C08G 18/76 | (2006.01) |
| C08G 18/24 | (2006.01) |
| C08G 18/38 | (2006.01) |
| C08G 18/64 | (2006.01) |
| C08G 18/65 | (2006.01) |

(52) U.S. Cl.
CPC ....... *C08G 18/7642* (2013.01); *C08G 18/161* (2013.01); *C08G 18/168* (2013.01); *C08G 18/242* (2013.01); *C08G 18/3868* (2013.01); *C08G 18/3874* (2013.01); *C08G 18/3876* (2013.01); *C08G 18/6453* (2013.01); *C08G 18/6547* (2013.01); *G02B 1/04* (2013.01)

(58) Field of Classification Search
CPC .............. C08G 18/161; C08G 18/7642; C08G 18/168; C08G 18/242; C08G 18/3876; C08G 18/6453; C08G 18/3874; C08G 18/3868; G02B 1/04
See application file for complete search history.

(56) References Cited

U.S. PATENT DOCUMENTS

| 6,472,495 B1 | 10/2002 | Yoshimura et al. | |
| 6,486,298 B1 * | 11/2002 | Jallouli | C08G 75/08 |
| | | | 351/159.01 |
| 2001/0030734 A1 | 10/2001 | Kosaka | |
| 2003/0171533 A1 | 9/2003 | Tamura et al. | |
| 2004/0254258 A1 * | 12/2004 | Horikoshi | G02B 1/04 |
| | | | 523/102 |
| 2005/0261467 A1 | 11/2005 | Tamura et al. | |
| 2009/0124785 A1 | 5/2009 | Shimakawa et al. | |
| 2010/0004421 A1 * | 1/2010 | Horikoshi | G02B 1/041 |
| | | | 528/59 |

FOREIGN PATENT DOCUMENTS

| EP | 0 936 233 | 8/1999 |
| EP | 3133098 A1 | 2/2017 |
| JP | 45-017434 | 6/1970 |
| JP | 11-292950 | 10/1999 |
| JP | 2001-131257 | 5/2001 |
| JP | 2001-330701 | 11/2001 |
| JP | 2002-332350 | 11/2002 |
| JP | 2003-064146 | 3/2003 |
| JP | 2004-516372 | 6/2004 |
| JP | 2004-339329 | 12/2004 |
| JP | 3632761 | 3/2005 |
| JP | 2007-084629 | 4/2007 |

(Continued)

OTHER PUBLICATIONS

"Polyurethane Ionomers. I. Structure-Properties Relationships of Polyurethane Ionomers" to Hsu et al. Journal of Applied Polymer Science, vol. 29, 2467-2479, 1984.*

(Continued)

*Primary Examiner* — Michael L Leonard
(74) *Attorney, Agent, or Firm* — Greenblum & Bernstein, P.L.C.

(57) ABSTRACT

The purpose of the present invention is to appropriately control the rate of polymerization of a composition in which a thiol compound and an isocyanate compound are added to an episulfide compound and thereby provide an optical material which has high transparency. This composition for use as optical material comprises (a) an episulfide compound, (b) an isocyanate compound, (c) a thiol compound, and (d) a benzyl halide compound represented by formula (1):

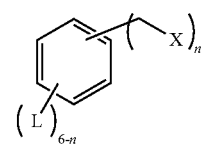

wherein: X is a halogen; L is selected from the group consisting of a hydrogen atom, a methyl group, a halogen, a mercaptomethyl group, and an isocyanate methyl group; and n is 1 or 2.

7 Claims, No Drawings

(56) References Cited

FOREIGN PATENT DOCUMENTS

| | | |
|---|---|---|
| JP | 2014-234429 | 12/2014 |
| JP | 2014-234430 | 12/2014 |
| WO | 02/051911 | 7/2002 |
| WO | 2007/010996 | 1/2007 |

OTHER PUBLICATIONS

Official Communication issued in International Bureau of WIPO Patent Application No. PCT/JP2018/007006, dated May 22, 2018.
Extended European Search Report dated Feb. 13, 2020 issued in EP application No. 18768617.5.

\* cited by examiner

COMPOSITION FOR USE AS OPTICAL MATERIAL

TECHNICAL FIELD

The present invention relates to a composition for optical materials which is used for an optical material such as a plastic lens, a prism, an optical fiber, an information recording substrate, a filter and the like.

BACKGROUND ART

Examples of techniques for simultaneously realizing a high refractive index, a high Abbe number and high heat resistance of an optical material include use of an episulfide compound. However, optical materials made of the compound have a problem of obtaining high strength. For this reason, researches have been made to improve various strengths such as tensile strength and impact resistance by adding a thiol compound and an isocyanate compound to an episulfide compound (see Patent Documents 1-4).

In a polymerization reaction of a composition obtained by adding a thiol compound and an isocyanate compound to an episulfide compound, various reactions such as a homopolymerization reaction of an episulfide group, a reaction between an episulfide group and a thiol group, a reaction between an episulfide group and an isocyanate group and a thiourethanation reaction between a thiol group and an isocyanate group proceed in a complicated manner. For this reason, there are problems such as generation of striae and white turbidity in a cured product which is caused, for example, by generation of portions with uneven refractive indexes in a resin.

For controlling high reactivity of episulfide groups and improving homogeneity of a cured product obtained, a halide of silicon, germanium, tin or antimony has been proposed (Patent Document 5). However, there was a case where white turbidity was generated in an obtained cured product when using the polymerization modifier exemplified in the Examples of Patent Document 5.

For this reason, it has been desired to develop a polymerization modifier which can achieve a balance between control of the polymerization rate and suppression of white turbidity of optical materials obtained.

CITATION LIST

Patent Literature

Patent Literature 1: Japanese Laid-Open Patent Publication No. H11-292950
Patent Literature 2: Japanese Laid-Open Patent Publication No. 2001-131257
Patent Literature 3: Japanese Laid-Open Patent Publication No. 2001-330701
Patent Literature 4: Japanese Laid-Open Patent Publication No. 2007-084629
Patent Literature 5: Japanese Patent No. 3632761

SUMMARY OF THE INVENTION

Technical Problem

Under such circumstances, it is desired to appropriately control the polymerization rate of a composition in which a thiol compound and an, isocyanate compound are added to an episulfide compound to provide an optical material having high transparency.

Solution to Problem

The present inventors found that, by blending a benzyl halide compound in a composition containing an episulfide compound, a thiol compound and an isocyanate compound, white turbidity of an optical material obtained can be suppressed while appropriately controlling the polymerization rate, and thus the present invention was achieved.

Specifically, the present invention is as described below.
[1] A composition for optical materials, which comprises an episulfide compound (a), a thiol compound (b), an isocyanate compound (c) and a benzyl halide compound (d) represented by formula (1):

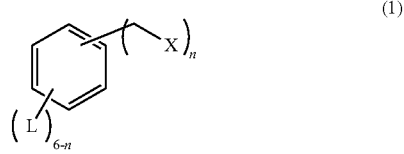

wherein: X represents a halogen; L is selected from the group consisting of a hydrogen atom, a methyl group, a halogen, a mercaptomethyl group and an isocyanate methyl group; when there are a plurality of Xs and a plurality of Ls, each of said Xs and Ls is selected independently; and n is 1 or 2.
[2] The composition for optical materials according to item [1], which further comprises a sulfur compound (e).
[3] The composition for optical materials according to item [1] or [2], wherein the ratio of the benzyl halide compound (d) in the composition for optical materials is 0.0001 to 5% by mass.
[4] The composition for optical materials according to any one of items [1] to [3], wherein the benzyl halide compound (d) is a benzyl chloride compound.
[5] The composition for optical materials according to any one of items [1] to [4], wherein the ratio of the episulfide compound (a) in the composition for optical materials is 50 to 90% by mass, and wherein the ratio of the sum of the thiol compound (h) and the isocyanate compound (c) in the composition for optical materials is 50 to 10% by mass.
[6] A cured product obtained by polymerizing and curing the composition for optical materials according to any one of items [1] to [5].
[7] A method for producing an optical material, which includes polymerizing and curing the composition for optical materials according to any one of items [1] to [5].

Advantageous Effects of Invention

By using the benzyl halide compound of the present invention, a complicated reaction of a composition comprising an episulfide compound, a thiol compound and an isocyanate compound can be controlled, and an optical material having high transparency can be industrially easily produced.

DESCRIPTION OF EMBODIMENT

The composition for optical materials of the present invention contains an episulfide compound (a), a thiol compound (b), an isocyanate compound (c), a benzyl halide compound (d) represented by formula (1) below, and according to need, other components.

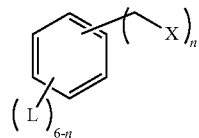

(1)

X represents a halogen. L is selected from the group consisting of a hydrogen atom, a methyl group, a halogen, a mercaptomethyl group and an isocyanate methyl group. When there are a plurality of Xs and a plurality of Ls, each of said Xs and Ls is selected independently n is 1 or 2.

Hereinafter, these materials will be described in detail.

[Episulfide Compound (a)]

The episulfide compound (a) of the present invention means an episulfide compound having at least one episulfide group in one molecule.

The episulfide compound (a) is preferably a compound having two episulfide groups in one molecule, and specific examples thereof include bis(β-epithiopropyl)sulfide, bis(β-epithiopropyl)disulfide, bis(β-epithiopropyl)trisulfide, bis(β-epithiopropylthio)methane, 1,2-bis(β-epithiopropyithio)ethane, 1,3-bis(β-epithiopropylthio)propane, 1,2-bis(β-epithiopropylthio)propane, 1,4-bis(β-epithiopropylthio)butane and bis(β-epithiopropylthioethyl)sulfide.

Among them, bis(β-epithiopropyl)sulfide (formula (2)) and bis(β-epithiopropyl)disulfide (formula (2)) are more preferred, and the most preferred specific example is bis(β-epithiopropyl)sulfide.

By using these compounds, the refractive index, strength and heat resistance can be improved. These compounds may be used solely, or two or more of them may be used in combination.

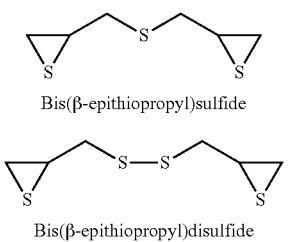

Bis(β-epithiopropyl)sulfide (2)

Bis(β-epithiopropyl)disulfide (3)

[Thiol Compound (b)]

In the present invention, the thiol compound (b) means a thiol compound having at least one mercapto group in one molecule.

The thiol compound (b) is preferably a compound having at least two mercapto groups in one molecule, and specific examples thereof include bis(2-mercaptoethyl)sulfide, m-xylylenedithiol, o-xylylenedithiol, 2,5-bis(mercaptomethyl)-1,4-dithiane, pentaerythritol tetrakis(2-mercaptoacetate), pentaerythritoltetrakis(3-mercaptopropionate) and 1,2-bis (2-mercaptoethylthio)-3-mercaptopropane.

By using these compounds, the refractive index, strength and heat resistance can be improved. These compounds may be used solely, or two or more of them may be used in combination.

[Isocyanate Compound (c)]

In the present invention, the isocyanate compound (c) means an isocyanate compound having at least one isocyanate group in one molecule.

The isocyanate compound (c) is preferably a compound having two isocyanate groups in one molecule, and specific examples thereof include o-xylylene diisocyanate, m-xylylene diisocyanate, p-xylylene diisocyanate, isophorone diisocyanate, 1,3-bis(isocyanatemethyl)cyclohexane and hexamethylene diisocyanate. By using these compounds, strength and heat resistance can be improved.

These compounds may be used solely, or two or more of them may be used in combination.

[Benzyl Halide Compound (d)]

The benzyl halide compound (d) to be used in the present invention is a compound represented by formula (1):

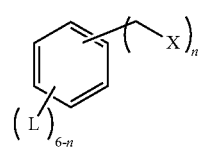

(1)

X represents a halogen, L is selected from the group consisting of a hydrogen atom, a methyl group, a halogen, a mercaptomethyl group and an isocyanate methyl group. n is 1 or 2.

Examples of X in the benzyl halide compound (d) include a chloro group, a bromo group, a fluoro group and an iodo group. Among them, a chloro group and a bromo group are preferred.

Even when L in the benzyl halide compound (d) is a halogen, examples of X include the same groups as above, and among them, a chloro group and a bromo group are preferred.

Preferred specific examples of the benzyl halide compound (d) include benzyl chloride, xylylene dichloride, mercapto methylbenzyl chloride, isocyanate methylbenzyl chloride, chlorobenzyl chloride, dichlorobenzyl chloride, benzyl bromide, xylylene dibromide, mercapto methylbenzyl bromide, isocyanate methylbenzyl bromide, bromobenzyl bromide and dibromobenzyl bromide.

Examples of more preferred compounds include those having a structure similar to that of the thiol compound (I)) or the isocyanate compound (c). For example, in the case where xylylenedithiol is used as the thiol compound (b) and xylylene diisocyanate is used as the isocyanate compound (c), xylylene dichloride, mercapto methylbenzyl chloride, isocyanate methylbenzyl chloride, xylylene dibromide, mercapto methylbenzyl bromide and isocyanate methylbenzyl bromide are preferred.

By selecting these compounds, the influence on optical physical properties of lenses can be minimized, and it is more effective for reducing white turbidity.

[Other Components]

<Sulfur Compound (e)>

To the composition for optical materials of the present invention, a sulfur compound (e) can be further added, and it is preferred from the viewpoint of the improvement of the refractive index of a cured product obtained. The sulfur compound (e) in the present invention means an inorganic compound having a sulfur atom.

Specific examples of the sulfur compound (e) include sulfur, hydrogen sulfide, carbon disulfide, hydrogen selenosulfide, ammonium sulfide, sulfur dioxide, a sulfur oxide such as sulfur dioxide, a thiocarbonate, sulfuric acid and salts thereof, a hydrogen sulfide salt, a sulfite, a hyposulphite, a persulfate, a thiocyanate, a thiosulfate, a halide such as sulfur dichloride, thionyl chloride, and thiophosgene, boron sulfide, nitrogen sulfide, silicon sulfide, phosphorus sulfide, arsenic sulfide, selenium sulfide, a metal sulfide and a metal hydrosulfide.

Among them, preferred is sulfur, carbon disulfide or selenium sulfide, and most preferred is sulfur. By using these compounds, optical characteristics having an excellent balance between the refractive index and the Abbe number can be imparted. These materials may be used solely, or two or more of them may be used in combination. When using the sulfur compound (e), the ratio thereof in the composition for optical materials is 0.01 to 40% by mass, preferably 0.1 to 30% by mass, and more preferably 1 to 20% by mass.

To the composition for optical materials of the present invention, a polymerization catalyst can be further added. The polymerization catalyst is not particularly limited as long as polymerization and curing are performed. Preferred specific examples thereof include triethyl benzyl ammonium chloride and tetra-n-butylphosphonium bromide.

The addition amount of the polymerization catalyst in the composition for optical materials is preferably 0.001 to 5% by mass, and more preferably 0.005 to 3% by mass.

When polymerizing and curing the composition for optical materials of the present invention, for the purpose of extension of the pot life, dispersion of heat generated by polymerization, etc., a polymerization modifier may also be used in addition to the polymerization catalyst. Examples of the polymerization modifier include halides of elements in groups 13 to 16 of the long form of the periodic table. Preferred specific examples thereof include dibutyltin dichloride, butyltin trichloride, dioctyltin dichloride, octyltin trichloride, dibutyldichlorogermanium, butyltrichlorogermanium, diphenyldichlorogermanium, phenyltrichlorogermanium and triphenylantimony dichloride.

The addition amount of the polymerization modifier in the composition for optical materials is preferably 0.001 to 5%, and more preferably 0.005 to 3% by mass.

To the composition for optical materials of the present invention, a performance modifier can be further added for the purpose of improving various performances such as oxidation resistance, weather resistance, dyeability, strength and refractive index. Examples of the performance modifier include compounds having at least two mercapto groups other than the thiol compound (b), epoxy compounds, carboxylic acids, carboxylic anhydrides, phenols, amines, vinyl compounds, allyl compounds, acrylic compounds and methacrylic compounds.

The addition amount of the performance modifier in the composition for optical materials is preferably 0.001 to 10% by mass, and more preferably 0.005 to 3% by mass.

To the composition for optical materials of the present invention, a publicly-known antioxidant, blueing agent, ultraviolet absorber, deodorizer, adhesiveness improving agent and mold release improving agent can be further added.

[Preparation of Composition for Optical Materials]

The composition for optical materials of the present invention is prepared by homogeneously mixing the episulfide compound (a), the thiol compound (b), the isocyanate compound (c), the benzyl halide compound (d), and according to need, other components.

The composition ratio of the composition for optical materials cannot be decided categorically because optical characteristics, various physical properties such as strength and heat resistance, etc. of an optical material Obtained vary depending on the types of the respective compounds. Usually, the ratio of the episulfide compound (a) is 50 to 90% by mass and the ratio of the sum of the thiol compound (b) and the isocyanate compound (c) is 50 to 10% by mass, preferably, the ratio of the compound (a) is 60 to 85% by mass and the ratio of the sum of the thiol compound (b) and the isocyanate compound (c) is 40 to 15% by mass, and more preferably, the ratio of the episulfide compound (a) is 65 to 85% by mass and the ratio of the sum of the thiol compound (b) and the isocyanate compound (c) is 35 to 1.5% by mass. When the ratios are within the above-described ranges, the effect of improving heat resistance and strength of a cured product can be enhanced.

Further, the ratio between the SH group of the thiol compound (b) and the NCO group of the isocyanate compound (c) is preferably SR group/NCO group=1.0 to 2.5, more preferably SH group/NCO group=1.25 to 2.25, and even more preferably SR group/NCO group=1.5 to 2.0. When the ratio is within the above-described range, heat resistance of a cured product can be kept at a high level while suppressing yellowness thereof.

The ratio of the benzyl halide compound (d) in the composition for optical materials is usually 0.0001 to 5% by mass, preferably 0.0005 to 3% by mass, and more preferably 0.001 to 1% by mass. When the ratio is within the above-described range, a balance between suppression of white turbidity of a cured product and suppression of increase in the viscosity of the composition can be achieved. The viscosity of the composition is preferably 10 to 3000 cP, more preferably 10 to 1000 cP, and even more preferably 10 to 300 cP. By adjusting the viscosity within the above-described range, cast molding can be easily carried out, and the productivity of optical materials is improved.

The mixing temperature is usually −50° C. to 100° C., and preferably −5° C. to 50° C. The mixing time is usually 1 minute to 12 hours, and preferably 5 minutes to 6 hours.

Further, it is preferred to perform deaeration treatment of the composition for optical materials after the mixing in view of transparency of a cured product. Specific examples of conditions for the deaeration treatment include: under a reduced pressure of 0.1 to 15000 Pa; from 1 minute to 24 hours; and from 0° C. to 100° C.

According to need, impurities, etc. can be filtered using a filter or the like to carry out purification.

[Curing of the Composition for Optical Materials]

The composition for optical materials of the present invention can be cured using a usual method for polymerization and curing.

For example, the composition for optical materials is injected into a mold made of glass or metal and subjected to heating with an electric furnace or irradiation of an active energy ray such as ultraviolet light, thereby obtaining a cured product.

Further, it is preferred to perform annealing treatment after the completion of the polymerization in terms of eliminating distortion of the optical material. Moreover, a surface treatment such as dyeing, hard coating, antireflection treatment, and imparting antifog properties, antifouling properties, impact resistance or the like can be performed according to need.

The present invention also includes a cured product obtained by polymerizing and curing the composition for optical materials in such a manner. According to a preferred embodiment of the present invention, by polymerizing and curing the composition for optical materials of the present invention, the polymerization rate can be controlled, and an optical material having high transparency can be provided. The obtained cured product can be suitably used as an optical material such as a plastic lens, a prism, an optical fiber, an information recording substrate, a filter and the like.

[Method for Producing Optical Material]

As described above, by polymerizing and curing the composition for optical materials of the present invention, an optical material such as a plastic lens, a prism, an optical fiber, an information recording substrate, a filter and the like can be produced. The present invention also includes a method for producing an optical material, which includes polymerizing and curing of the composition for optical materials of the present invention.

EXAMPLES

Hereinafter, the present invention will be specifically described based on working examples, but embodiments can be suitably changed within a range in which the effects of the present invention are exerted. Note that analysis of the obtained compositions for optical materials and optical materials was conducted in manners described below.

[Viscosity of Polymerization Solution]

The viscosity of the polymerization solution at 20'C was measured using a B-type viscometer (Visco Elite manufactured by FUNGILAB).

[The Rate of Generation of White Turbidity in Optical Materials]

100 circular flat plates of the optical materials obtained in the Examples and Comparative Examples (plastic lenses having a thickness of 10.0 mm and φ of 83 mm) were visually observed under a high-pressure mercury vapor lamp in a dark room, and when turbidity was confirmed in a lens, it was judged as having white turbidity, thereby calculating the rate of generation of white turbidity.

Example 1

80.0 parts by mass of bis(β-epithiopropyl)sulfide (hereinafter referred to as the compound a-1) as the episulfide compound (a), 11.2 parts by mass of bis(2-mercaptoethyl) sulfide (hereinafter referred to as the compound b-1) as the thiol compound (b), 8,8 parts by mass of m-xylylene diisocyanate (hereinafter referred to as the compound c-1) as the isocyanate compound (c), 0.01 part by mass of in-xylylene dichloride (hereinafter referred to as the compound d-1) as the benzyl halide compound (d), and 0.1 part by mass of tetra-n-butylphosphonium bromide as the polymerization catalyst were mixed together at 2.0° C. For 3 hours to prepare a composition for optical materials. The viscosity of the composition for optical materials at 20° C. Was 42 EA.

The obtained composition for optical materials was subjected to the deaeration treatment under a reduced pressure of 1000 Pa for 30 minutes, and filtered using a PATE membrane filter of 0.5 μm. Next, the composition was injected into a mold in which 2 opposed glass molds (φ: 83 mm) were used and the peripheral portions thereof were wrapped with an adhesive tape to which a silicon-based adhesive material was applied. Using an oven, the composition was heated at 30° C. for 10 hours, and then the temperature was elevated from 30° C. to 100° C. over 10 hours, and finally, the composition was polymerized and cured at 100° C. for 1 hour. The cured product was cooled to room temperature and released from the mold, and then annealed at 110° C. for 1 hour, thereby obtaining an optical material. The rate of generation of white turbidity of the obtained optical material was 1%. The evaluation results are shown in Table 1.

Examples 2-31

The operation was carried out in a manner similar to that in Example 1, except that the composition was changed as shown in Table 1 (only in Example 5, the mixing time was changed to 5 hours). The evaluation results regarding the viscosity of the obtained composition for optical materials and the rate of generation of white turbidity of the optical material are shown in Table 1.

Comparative Examples 1-4

The operation was carried out in a manner similar to that in Example 1, except that the composition was changed as shown in Table 2. The evaluation results regarding the viscosity of the obtained composition for optical materials and the rate of generation of white turbidity of the optical material are shown in Table 2.

TABLE 1

| Examples | Compound (a) | Compound (b) | Compound (c) | Compound (d) | Compound (e) | Polymerization catalyst/ Polymerization modifier | Viscosity (20° C.) cP | Rate of white turbidity (%) |
|---|---|---|---|---|---|---|---|---|
| 1 | a-1 (80.0) | b-1 (11.2) | c-1 (8.8) | d-1 (0.01) | — | TBPB (0.1) | 42 | 1 |
| 2 | a-1 (70.0) | b-1 (16.8) | c-1 (13.2) | d-1 (0.01) | — | TBPB (0.1) | 55 | 1 |
| 3 | a-1 (60.0) | b-1 (22.4) | c-1 (17.6) | d-1 (0.01) | — | TBPB (0.1) | 66 | 3 |
| 4 | a-1 (80.0) | b-1 (11.2) | c-1 (8.8) | d-1 (0.1) | — | TBPB (0.1) | 38 | 1 |
| 5 | a-1 (80.0) | b-1 (11.2) | c-1 (8.8) | d-2 (0.01) | — | TBPB (0.1) | 41 | 2 |
| 6 | a-1 (80.0) | b-1 (11.2) | c-1 (8.8) | d-3 (0.01) | — | TBPB (0.1) | 42 | 1 |
| 7 | a-1 (80.0) | b-1 (11.2) | c-1 (8.8) | d-4 (0.02) | — | TBPB (0.1) | 44 | 3 |
| 8 | a-1 (60.0) | b-1 (22.4) | c-1 (17.6) | d-1 (0.01) | — | TBPB (0.1) | 95 | 3 |
| 9 | a-1 (70.0) | b-1 (17.8) | c-1 (12.2) | d-1 (0.01) | — | TBPB (0.1) | 58 | 1 |
| 10 | a-1 (70.0) | b-1 (19.0) | c-1 (11.0) | d-1 (0.01) | — | TBPB (0.1) | 63 | 3 |
| 11 | a-1 (70.0) | b-2 (17.5) | c-1 (12.5) | d-1 (0.01) | — | TBPB (0.1) | 51 | 1 |
| 12 | a-1 (70.0) | b-2 (18.5) | c-1 (11.5) | d-1 (0.1) | — | TBPB (0.1) | 54 | 2 |
| 13 | a-1 (70.0) | b-2 (16.5) | c-2 (13.7) | d-1 (0.1) | — | TBPB (0.1) | 49 | 3 |
| 14 | a-1 (60.0) | b-2 (21.8) | c-2 (18.2) | d-1 (0.01) | — | TBPB (0.1) | 71 | 4 |
| 15 | a-1 (80.0) | b-1 (10.4) | c-2 (9.6) | d-1 (0.01) | — | TBPB (0.1) | 40 | 4 |
| 16 | a-1 (80.0) | b-3 (11.9) | c-2 (8.1) | d-1 (0.01) | — | TBPB (0.1) | 40 | 2 |
| 17 | a-1 (65.0) | b-4 (28.0) | c-1 (7.0) | d-1 (0.01) | — | TBPB (0.1) | 72 | 4 |
| 13 | a-2 (70.0) | b-1 (16.8) | c-1 (13.2) | d-1 (0.01) | — | TBPB (0.1) | 48 | 3 |
| 19 | a-2 (70.0) | b-2 (16.3) | c-2 (13.7) | d-1 (0.1) | — | TBPB (0.1) | 46 | 4 |

TABLE 1-continued

| Examples | Compound (a) | Compound (b) | Compound (c) | Compound (d) | Compound (e) | Polymerization catalyst/ Polymerization modifier | Viscosity (20° C.) cP | Rate of white turbidity (%) |
|---|---|---|---|---|---|---|---|---|
| 20 | a-2 (70.0) | b-2 (17.3) | c-3 (12.7) | d-1 (0.1) | — | TBPB (0.1) | 54 | 4 |
| 21 | a-1 (77.0) | b-1 (11.2) | c-1 (8.8) | d-1 (0.01) | e-1 (3.0) | TBPB (0.1) | 51 | 2 |
| 22 | a-1 (75.0) | b-1 (11.2) | c-1 (8.8) | d-1 (0.01) | e-1 (5.0) | TBPB (0.1) | 55 | 2 |
| 23 | a-2 (65.0) | b-2 (16.3) | c-2 (13.7) | d-1 (0.1) | e-1 (5.0) | TBPB (0.1) | 60 | 6 |
| 24 | a-1 (80.0) | b-1 (11.2) | c-1 (8.8) | d-1 (0.01) | — | TBPB (0.1)/ DBTDC (0.01) | 40 | 3 |
| 25 | a-1 (80.0) | b-1 (11.2) | c-1 (8.8) | d-1 (1.0) | — | TBPB (0.1) | 39 | 3 |
| 26 | a-1 (80.0) | b-1 (11.2) | c-1 (8.8) | d-1 (3.0) | — | TBPB (0.1) | 36 | 10 |
| 27 | a-1 (80.0) | b-1 (11.2) | c-1 (8.8) | d-1 (0.005) | — | TBPB (0.1) | 43 | 2 |
| 28 | a-1 (80.0) | b-1 (11.2) | c-1 (8.8) | d-1 (0.002) | — | TBPB (0.1) | 48 | 3 |
| 29 | a-1 (80.0) | b-1 (11.2) | c-1 (8.8) | d-1 (0.001) | — | TBPB (0.1) | 57 | 5 |
| 30 | a-1 (80.0) | b-1 (11.2) | c-1 (8.8) | d-1 (0.0005) | — | TBPB (0.1) | 88 | 9 |
| 31 | a-1 (80.0) | b-1 (11.2) | c-1 (8.8) | d-5 (0.005) | — | TBPB (0.1) | 39 | 2 |

TABLE 2

| Comparative Examples | Compound (a) | Compound (b) | Compound (c) | Compound (d) | Compound (e) | Polymerization catalyst/ Polymerization modifier | Viscosity (20° C.) cP | Rate of white turbidity (%) |
|---|---|---|---|---|---|---|---|---|
| 1 | a-1 (80.0) | b-1 (11.2) | c-1 (8.8) | — | — | TBPB (0.1) | 3030 | 100 |
| 2 | a-1 (80.0) | b-1 (11.2) | c-1 (8.8) | — | — | TBPB (0.1)/ DBTDC (0.01) | 340 | 79 |
| 3 | a-1 (80.0) | b-1 (11.2) | c-1 (8.8) | — | — | TBPB (0.1)/ DBTDC (0.1) | 38 | 33 |
| 4 | a-1 (75.0) | b-1 (11.2) | c-1 (8.8) | — | e-1 (5.0) | TBPB (0.1)/ DBTDC (0.1) | 51 | 43 |

Note that the numerical values in parentheses written together with the compounds in the tables are the content percentages of the compounds in the compositions. As the compounds in the tables, the below-described materials were used.

(a-1) bis(β-epithiopropyl)sulfide
(a-2) bis(β-epithiopropyl)disulfide
(b-1) bis(2-mercaptomethyl)sulfide
(b-2) m-xylylenedithiol
(b-3) 2,5-bis(mercaptomethyl)-1,4-dithiane
(b-4) pentaerythritol tetrakis(3-mercaptopropionate)
(c-1) m-xylylene diisocyanate
(c-2) isophorone diisocyanate
(c-3) 1,3-bis(isocyanatemethyl)cyclohexane
(d-1) m-xylylene dichloride
(d-2) p-xylylene dichloride
(d-3) o-xylylene dichloride
(d-4) benzyl chloride
(d-5) m-xylylene dibromide
(e-1) sulfur
TBPB: tetra-n-butylphosphonium bromide
DBTDC: dibutyltin dichloride

INDUSTRIAL APPLICABILITY

The present invention provides a composition for optical materials. A cured product obtained by polymerizing and curing the composition for optical materials of the present invention can be suitably used as an optical material such as a plastic lens, a prism, an optical fiber, an information recording substrate, a filter and the like.

The invention claimed is:

1. A composition for optical materials, which comprises an episulfide compound (a), a thiol compound (b), an isocyanate compound (c), and a benzyl halide compound (d) represented by formula (1):

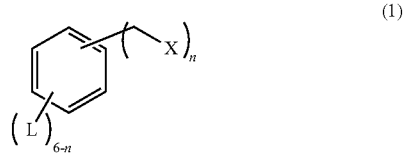

wherein: X represents a halogen; L is selected from the group consisting of a hydrogen atom, a methyl group, a halogen, a mercaptomethyl group, and an isocyanate methyl group; when there are a plurality of Xs and a plurality of Ls, each of said Xs and Ls is selected independently; and n is 2;

wherein the thiol compound (b) is selected from the group consisting of m-xylylenedithiol, p-xylylenedithiol, and o-xylylenedithiol, or the isocyanate compound (c) is selected from the group consisting of o-xylylene diisocyanate, m-xylylene diisocyanate, and p-xylylene diisocyanate.

2. The composition for optical materials according to claim 1, which further comprises a sulfur compound (e).

3. The composition for optical materials according to claim 1, wherein the benzyl halide compound (d) in the composition for optical materials is 0.0001 to 5% by mass of the composition.

4. The composition for optical materials according to claim 1, wherein the benzyl halide compound (d) is a benzyl chloride compound.

5. The composition for optical materials according to claim 1, wherein the episulfide compound (a) in the composition for optical materials is 50 to 90% by mass of the composition, and wherein the sum of the thiol compound (b) and the isocyanate compound (c) in the composition for optical materials is 50 to 10% by mass of the composition.

6. A cured product obtained by polymerizing and curing the composition for optical materials according to claim 1.

7. A method for producing an optical material, which includes polymerizing and curing the composition for optical materials according to claim 1.

* * * * *